June 12, 1928.
J. O. GARGAN
1,673,005
CONDENSER
Filed Jan. 5, 1926
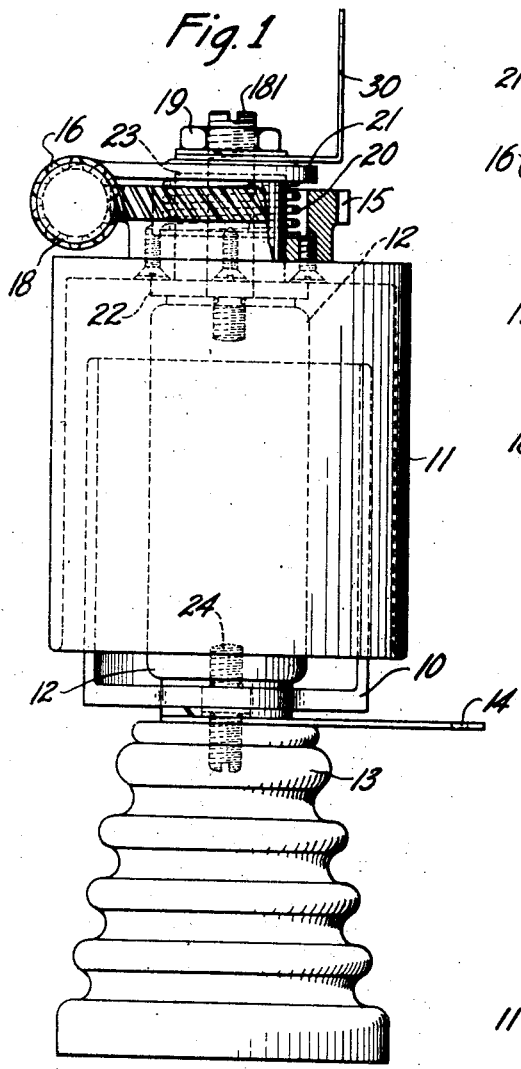
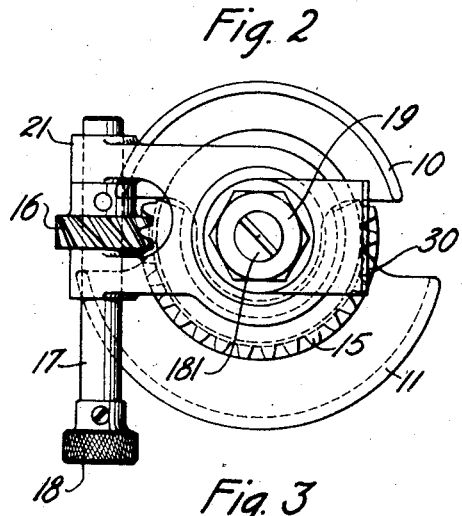
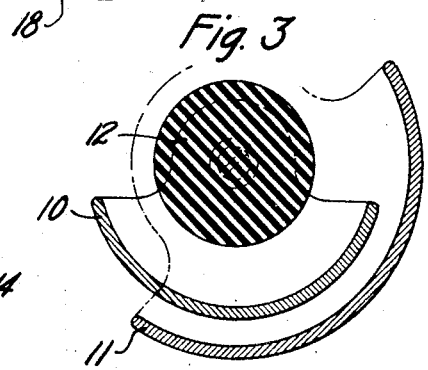
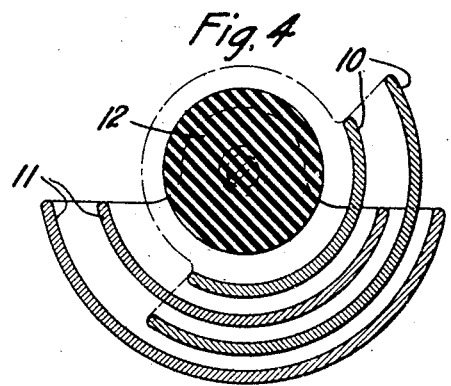
Inventor:
John O. Gargan
by ℰ.W.adams Atty.

Patented June 12, 1928.

1,673,005

UNITED STATES PATENT OFFICE.

JOHN O. GARGAN, OF BROOKLYN, NEW YORK, ASSIGNOR TO BELL TELEPHONE LABORATORIES, INCORPORATED, OF NEW YORK, N. Y., A CORPORATION OF NEW YORK.

CONDENSER.

Application filed January 5, 1926. Serial No. 79,283.

This invention relates to condensers.

An object of the invention is to provide a condenser adapted to withstand high voltage.

Another object is to secure low minimum capacity in a high voltage condenser.

A further object is to provide an adjustable condenser suitable for compensating the inherent capacity between electrodes of a space discharge tube.

The condenser of the invention may comprise one or more pairs of concentric plates of semi-cylindrical form separated by an air dielectric. The plates are mounted upon opposite ends of an insulator adapted to withstand high voltages. One of the plates may be fixed and the other rotatable about an axis by a gear drive, so that fine adjustments of its capacity may be effected. The condenser of the invention is suited to many uses, but is particularly adapted to compensate the inherent capacity of space discharge tubes, especially high power tubes.

The invention is illustrated in the drawing, wherein:

Fig. 1 is a complete side view of a condenser designed in accordance with the invention.

Fig. 2 is a plan view of the condenser shown in Fig. 1.

Fig. 3 shows diagrammatically in cross section the relative position of the plates.

Fig. 4 illustrates diagrammatically in cross section a condenser designed in accordance with the invention having a plurality of pairs of plates.

In the several figures of the drawing, like reference characters have been used to indicate like parts.

The condenser shown in Figs. 1 and 2 comprises an inner semi-cylindrical plate 10 and an outer semi-cylindrical plate 11 arranged coaxially and attached to opposite ends of a cylindrical high voltage insulator 12. Plates 10 and 11 are mounted upon a base 13 of insulating material adapted to withstand high voltages. When it is desired to ground the plate 10, the insulator 13 may be omitted and a conducting plate substituted therefor. The plate 10 and a terminal 14 are fastened between the insulators 12 and 15 by a bolt 24.

The terminal 14 enables the plate 10 to be connected to any electrical circuit.

The plate 11, is adapted to be rotated. Attached to the plate 11 is a helical gear 15. This gear meshes with a pinion 16 attached to a shaft 17 provided with a knurled nut 18 or any other suitable means by which it may be rotated. The shaft 17 is journaled in bearings provided in a supporting member 21. A terminal 30 is provided to enable the plate 11 to be connected to an electric circuit. The plate 11 is journaled upon a bearing 22 attached to the insulator 12 and is rotatable about a collar 23. The bearing 22 and the collar 23 are fastened to the insulator 12 by a bolt 181 provided with a nut 19. The supporting member 21 and the terminal member 30 are held on the bolt 181 between the collar 23 and the nut 19.

A coil spring 20 is positioned around a portion of the collar 22 inside a recess in the gear 15 and is adapted to maintain a firm electrical connection between the plate 11 and the terminal member 30 through the gear 15 and the supporting member 21.

As illustrated in Figs. 1 and 2 the plates are in such position that the capacity of the condenser is a minimum. In general, high voltage condensers in use at the present time consist of a number of plates and a number of high voltage insulators secured together in assembled relation by metallic screws or metallic bolts and nuts; with the results that these metallic elements introduce capacity effects supplementing that determined by the relative positions of the condenser plates. Hence, when the condenser plates are adjusted to produce a minimum value of capacity, this value is determined in part by the plates and in part by the securing means.

In the condenser described above the number of insulating and conducting elements, including those necessary to the assembly, are reduced to a minimum. Again the securing bolts for each plate are spaced a considerable distance from the nearest portion of the oppositely charged plate, and consequently the value of the capacity between these bolts is substantially negligible. When so constructed the value of the minimum capacity of the condenser will be determined solely by the plates and may be made as small as desired by designing the condenser with relative great spacing of the plates and associated metallic mounting members.

Fig. 3 is a diagram in cross section of plates 10 and 11 showing plate 10 rotated within the plate 11. The high voltage insulator 12 is also shown in cross section in this figure.

It is found that if the surfaces of the plates of a condenser, to be subjected to high voltages, are highly polished, the voltage at which break down occurs will be much higher than if the plates are unpolished. The plates of the condenser herein described are so formed that their surfaces may be readily given a high polish. By virtue of this fact, this condenser is capable of withstanding increased voltages. Such condenser is suitable for use in high power radio transmitters for supplying a finely adjustable capacity adapted, for example, to compensate the inherent interelectrode capacity of the space discharge tubes included in a high voltage circuit.

Although the plates are illustrated as semi-cylindrical in form, it is quite evident that the curvature may be varied, and that by this means the rate of change of capacity with respect to angle of rotation may be caused to follow several different laws.

Fig. 4 is a diagram in cross-section of a condenser similar in all respects to that illustrated in Figs. 1, 2 and 3 except that two pairs of semi-cylindrical plates 10 and 11 are provided. By this means the capacity range of the condenser may be greatly increased and by including still other pairs of plates in the manner illustrated, the capacity range may be still further extended.

Although this invention has been illustrated in connection with certain specific embodiments, it is clear that the principles involved may be applied to other forms and for this reason the invention is to be limited only as indicated by the scope of the appended claims.

What is claimed is:

1. A condenser which comprises a fixed semi-cylindrical plate, a rotatable semi-cylindrical plate, a high voltage insulator, and means for attaching said plates to the opposite ends of said insulator, said insulator constituting the sole physical connection between said plates.

2. A condenser which comprises a fixed semi-cylindrical plate, a rotatable semi-cylindrical plate, a high voltage insulator, said plates being attached to opposite ends of said insulator, which constitutes the sole physical connection between said plates, a base of high voltage insulating material, said fixed plate being attached to said base.

3. A condenser comprising a pair of curved plates of conducting material, a high voltage insulator, means for securing said plates to the respective opposite ends of said insulator, which constitutes the sole physical connection between said plates, means for producing relative rotation of said plates, a terminal member, and means for maintaining said terminal member electrically connected to said rotatable plate.

4. A condenser comprising a pair of semi-cylindrical plates, a high voltage insulator, means for securing said plates to opposite ends of said insulator and for maintaining them spaced apart, said insulator constituting the sole physical connection between said plates, and means for rotating one of said plates relatively to the other of said plates.

5. A condenser which comprises a plurality of fixed semi-cylindrical plates, a plurality of rotatable semi-cylindrical plates, said plates being arranged coaxially, certain of said rotatable plates being adapted to move between certain of said fixed plates, a high voltage insulator, said fixed and rotatable plates being attached to opposite ends of said insulator, which constitutes the sole physical connection between said plates, and a gear for rotating said rotatable plates.

In witness whereof, I hereunto subscribe my name this 30th day of December A. D., 1925.

JOHN O. GARGAN.